US010763658B2

(12) United States Patent
Frizzell

(10) Patent No.: US 10,763,658 B2
(45) Date of Patent: Sep. 1, 2020

(54) CABLE CONNECTOR ASSEMBLY

(71) Applicant: CMP PRODUCTS LIMITED, Newcastle upon Tyne (GB)

(72) Inventor: Lee Frizzell, Cramlington (GB)

(73) Assignee: CMP PRODUCTS LIMITED, St. Peters, Newcastle Upon Tyne (GB)

( * ) Notice: Subject to any disclaimer, the term of this patent is extended or adjusted under 35 U.S.C. 154(b) by 0 days.

(21) Appl. No.: 16/475,823

(22) PCT Filed: Dec. 19, 2017

(86) PCT No.: PCT/EP2017/083506
§ 371 (c)(1),
(2) Date: Jul. 3, 2019

(87) PCT Pub. No.: WO2018/127400
PCT Pub. Date: Jul. 12, 2018

(65) Prior Publication Data
US 2019/0356124 A1 Nov. 21, 2019

(30) Foreign Application Priority Data

Jan. 4, 2017 (EP) ..................................... 17150283

(51) Int. Cl.
*H02G 15/013* (2006.01)
*H02G 15/04* (2006.01)
*H02G 3/06* (2006.01)

(52) U.S. Cl.
CPC ......... *H02G 15/013* (2013.01); *H02G 3/0666* (2013.01); *H02G 15/04* (2013.01)

(58) Field of Classification Search
CPC ..... H02G 15/013; H02G 3/0666; H02G 15/04
USPC ...................................................... 174/77 R
See application file for complete search history.

(56) References Cited

U.S. PATENT DOCUMENTS

| 8,435,073 | B2 * | 5/2013 | Wild | .................... | H01R 24/564 |
| | | | | | 439/578 |
| 2007/0270032 | A1 * | 11/2007 | Eriksen | .............. | H01R 13/5825 |
| | | | | | 439/578 |
| 2012/0088407 | A1 * | 4/2012 | Natoli | .................. | H01R 24/564 |
| | | | | | 439/585 |

FOREIGN PATENT DOCUMENTS

| DE | 3739714 C1 | 2/1989 |
| EP | 0618655 A1 | 10/1994 |
| EP | 1881576 A1 | 1/2008 |
| WO | 2005031935 A1 | 4/2005 |
| WO | 2007107761 A1 | 9/2007 |

OTHER PUBLICATIONS

Search Report and Written Opinion for PCT/EP2017/083506, dated Mar. 19, 2018.

* cited by examiner

*Primary Examiner* — Timothy J Thompson
*Assistant Examiner* — Michael F McAllister
(74) *Attorney, Agent, or Firm* — Benjamin C. Armitage; Billion & Armitage

(57) ABSTRACT

A cable connector assembly (2) comprises a connector body (6) adapted to be mounted to a cable, a resilient first seal (30) for sealing between the cable and the connector body and having a first aperture, and a seal opening device (44) adapted to extend through and enlarge the first aperture, and having a hollow body part (46) for enabling part of the cable to extend through the first aperture without engaging the first seal, wherein the seal opening device is adapted to be removed from the connector body to enable the first seal to resiliently engage the cable.

18 Claims, 19 Drawing Sheets

CABLE CONNECTOR ASSEMBLY

CROSS-REFERENCE TO RELATED APPLICATIONS

This application is a National Stage Application of PCT/EP2017/083506, filed on Dec. 19, 2017, which claims benefit of EP Application No. 17150283.4, filed on Jan. 4, 2017 and which applications are incorporated herein by reference. A claim of priority to all, to the extent appropriate, is made.

FIELD OF THE INVENTION

The present disclosure relates to cable connector assembly, and relates particularly, but not exclusively, to a cable gland assembly for connection to a cable to enable the cable to be connected to an enclosure.

BACKGROUND

Known cable glands, for connecting a cable to an enclosure, hold a cable extending through the cable gland in position and a resilient seal is arranged between an exposed inner sheath of the cable passing through an aperture of the seal and the internal surface of a cable gland body. One part of the seal acts as a diaphragm seal and is caused to grip the external surface of the cable by means of pushing the cable axially through the seal, which stretches to accommodate the cable, so that a frictional seal is achieved between the seal and the cable. In addition, another part of the seal is compressible by means of threaded engagement of a first body part with a second body part which then creates a compressive seal between the seal and at least the first body part.

This known arrangement suffers from the drawback that insertion of the cable through the seal to locate it in position in the gland body can cause excessive wear of, or instant damage to the seal (especially if the cable end has been cut leaving sharp edges exposed), and threaded engagement of the first body part with the second body part to clamp any cable armours or braids and/or to tighten any outer sealing ring onto the cable can cause twisting of the seal, which can in turn lead to further excessive wear of, or damage to, the seal. The known arrangement suffers from the further disadvantage that because the seal engages the cable when the cable is inserted through the gland body, if the cable is inserted too far into the gland body and needs to be retracted relative to the gland body, retraction of the cable can cause buckling of the seal, which can cause failure of the seal.

Preferred embodiments of the present disclosure seek to overcome one or more of the above disadvantages of the prior art.

SUMMARY

According to the present disclosure, there is provided a cable connector assembly comprising:
  a connector body adapted to be mounted to a cable extending through said connector body;
  at least one resilient first seal adapted to be located in the connector body for sealing between the cable and the connector body, wherein the first seal has a respective first aperture therethrough for resiliently engaging part of said cable extending through said first aperture; and
  at least one aperture opening device adapted to extend through and enlarge said first aperture, and having a hollow body portion for enabling said part of said cable to extend through said first aperture without engaging said first seal, wherein said aperture opening device is adapted to be removed from the connector body to enable said first seal to resiliently engage said part of said cable extending through said first aperture.

By providing an aperture opening device adapted to extend through and enlarge the first aperture, and having a hollow body portion for enabling part of the cable to extend through the first aperture without engaging the first seal, wherein the aperture opening device is adapted to be removed from the connector body to enable the first seal to resiliently engage the part of the cable extending through the first aperture, this provides the advantage of reducing wear of, or damage to the seal during insertion of the cable into the connector body, and avoiding twisting of the seal during threaded engagement of first and second parts of the connector body to close the connector body around the cable, by enabling removal of the aperture opening device at a suitable point in time, when all cable installation and termination activities that would cause the cable to move or twist within the cable gland have been completed. The present disclosure provides the further advantage of enabling correct location of a cable in the connector body, and possible retraction of the cable relative to the connector body if the cable is inserted too far into the body, before the first seal engages the cable, thereby avoiding buckling of the first seal and reducing the risk of failure of the first seal.

At least one said aperture opening device may include a tapering part for assisting insertion of the aperture opening device into at least one said first aperture.

This provides the advantage of reducing the risk of damage or excessive wear to the first seal on insertion of the aperture opening device into the first aperture.

At least one said tapering part may be removable.

At least one said aperture opening device may include a first grippable part for enabling the aperture opening device to be pulled into at least one said first aperture.

At least one said aperture opening device may include a second grippable part for enabling the aperture opening device to be pulled out of the connector body.

This provides the advantage of enabling the second grippable part to act as a visual indicator that the aperture opening device has not been removed from the connector body, while making removal of the aperture opening device by hand easier.

The connector body may include a first body part and a second body part adapted to engage said first body part to cause at least one said first seal and/or said cable to be located relative to said connector body.

The assembly may further comprise gripping means for gripping at least one sheath of said cable to locate said cable in position relative to the connector body.

The gripping means may comprise at least one first gripping part and at least one second gripping part, wherein a first sheath of the cable is gripped between at least one said first gripping part and at least one said second gripping part as a result of engagement of said first body part with said second body part.

At least one said first seal may be gripped between the first gripping part and the first body part as a result of engagement of the first body part with the second body part.

This provides the advantage of enabling the number of component parts of the assembly to be reduced.

The gripping means may comprise a plurality of first clamping members for gripping a first sheath of said cable, a plurality of second clamping members for gripping a second sheath of said cable, and actuator means for actuating said first and second clamping members.

The gripping means may further comprise at least one actuator member having at least one respective first inclined surface, for engaging at least one second inclined surface on a respective said first clamping member to cause said first clamping member to grip a first sheath of the cable, at least one respective third inclined surface, for engaging at least one fourth inclined surface on a respective said second clamping member to cause said second clamping member to grip a second sheath of the cable.

This provides the advantage of enabling more compact construction of the assembly.

At least one said aperture opening device may be adapted to be removed from the connector body by means of engagement by said cable.

At least one said aperture opening device may have a cable engaging part for engaging said cable to enable the aperture opening device to be pushed through at least one said first aperture by said cable.

The assembly may further comprise seal clamping means for clamping at least one seal between said seal clamping means and said connector body.

The seal clamping means may comprise at least one seal clamping member adapted to engage the connector body.

At least one said first seal may be adapted to be inverted on said cable by means of movement of said cable relative to the connector body.

The assembly may further comprise at least one protection member for at least partly covering part of said first seal protruding from the connector housing.

The assembly may further comprise a third body part, adapted to engage said second body part, and a second resilient seal having a second aperture therethrough, wherein said second seal is adapted to seal between said connector body and a part of the cable extending through said second aperture as a result of engagement of said third body part with said second body part.

Preferred embodiments of the present disclosure will now be described, by way of example only and not in any limitative sense, with reference to the accompanying drawings, in which:—

DETAILED DESCRIPTION

Figure 1:
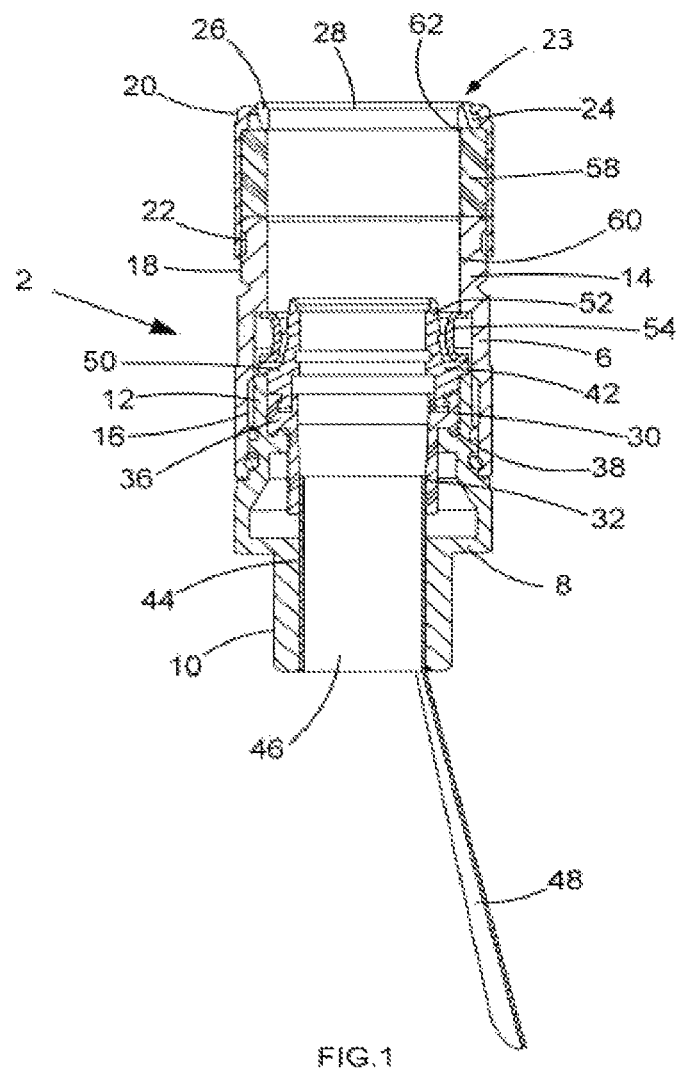
FIG. 1 is a partially cut away side view of a cable connector assembly of a first embodiment of the present disclosure, prior to insertion of a cable.

Referring to FIG. 1, a cable connector assembly 2 of a first embodiment of the present disclosure for mounting a cable 4 (FIG. 2) to an enclosure (not shown) has a connector body 6 which includes a first body part 8 and a second body part 14. The first body part 8 has a first external screw thread 10, for engaging an internal screw thread of an aperture in an enclosure (not shown) for mounting the cable 4 to the enclosure, and a second external screw thread 12. The second body part 14 has an internal screw thread 16 for engaging the second external screw thread 12 of the first body part 8, and an external screw thread 18. A third body part 20 has an internal screw thread 22 for engaging the external screw thread 18 of the second body part 14, and has an aperture 23 for engaging a shoulder 24 of a ferrule 26 to hold the ferrule 26 in position. The ferrule 26 has an aperture 28 for enabling the cable 4 to extend therethrough.

A resilient first seal 30 has a first aperture 32 for resiliently engaging an inner sheath 34 (FIG. 2) of the cable 4 extending through the aperture 32, and an annular flange 36 for clamping between a groove 38 in the first body part 8 and a groove 40 in a first clamping part 42 so that the seal 30 is held in position between the first body part 8 and the first clamping part 42. A seal opening device 44 having a hollow body part 46 and a first grippable part 48 is located in the aperture 32 of the seal 30 to maintain the aperture 32 in an enlarged condition to enable insertion of the exposed inner sheath 34 of the cable 4 through the hollow body part 46 without the seal 30 coming into contact with the cable 4.

The first clamping part 42 has an annular portion 50 and a conical portion 52, and an annular second clamping part 54 surrounds the conical portion 52 and abuts the annular portion 50 and the second body part 14 to enable conductive earthing members 56 (FIG. 2) forming part of the sheath of the cable 4 to be clamped between the first 42 and second 54 clamping parts. A resilient second seal 58 is located between the second body part 14 and the ferrule 26 such that threaded engagement of the third body part 20 with the second body part 14 axially compresses the second seal 58 to cause it to seal between the third body part 20 and an outer sheath 60 of the cable 4 (FIG. 2) extending through an aperture 62 in the second seal 58.

The operation of the assembly 2 of FIGS. 1 to 10 will now be described.

Figure 2:
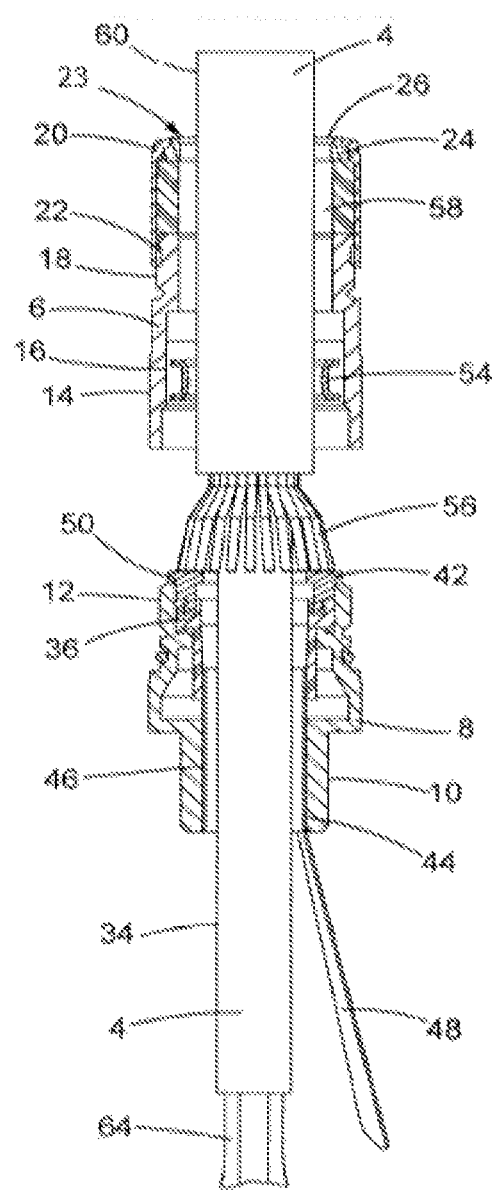
FIG. 2 is a partially cut away side view of the assembly of FIG. 1 with first and second body parts thereof separated and a cable inserted into the assembly.
Figure 3:
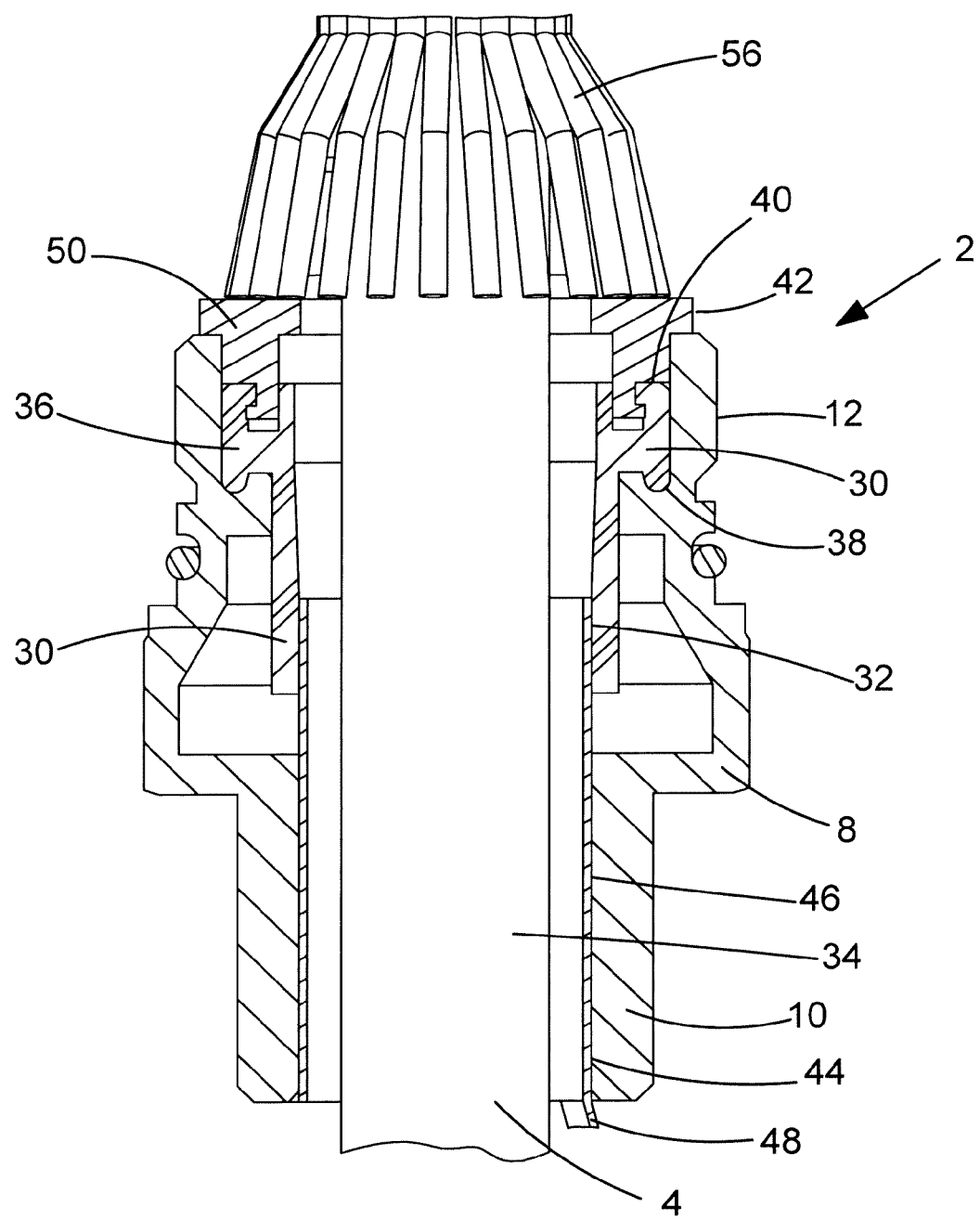
FIG. 3 is an enlarged view of part of the assembly of FIG. 2.

Referring to FIGS. 2 and 3, the first 8 and second 14 body parts are firstly separated from each other, and part of the outer sheath 60 of the cable 4 is removed to expose the inner sheath 34 of the cable 4 containing electrical conductors 64 and the electrically conductive earth members 56. The exposed earth members 56 are then cut back to expose the ends of the earth members 56 in a region between the exposed inner sheath 34 and the intact outer sheath 60, as shown in FIG. 2. The second body part 14 containing the second seal 58 and the second clamping part 54 is located over the outer sheath 60 of the cable 4. The third body part 20 is loosely located on the second body part 14 so that the second seal 58 is uncompressed, thereby enabling the outer sheath 60 of the cable 4 to easily pass through the aperture 62 in the second seal 58.

The exposed inner sheath 34 of the cable is then passed through the aperture in the first clamping part 42 and through the hollow body part 46 of the aperture opening device 44 located in the first body part 8 until the exposed electrically conducting earth members 56 come into contact with an end face of the first clamping part 42. In this way, the inner sheath 34 of the cable 4 extends through the first aperture 32 in the first seal 30 without coming into contact with the first seal 30.

Figure 4:
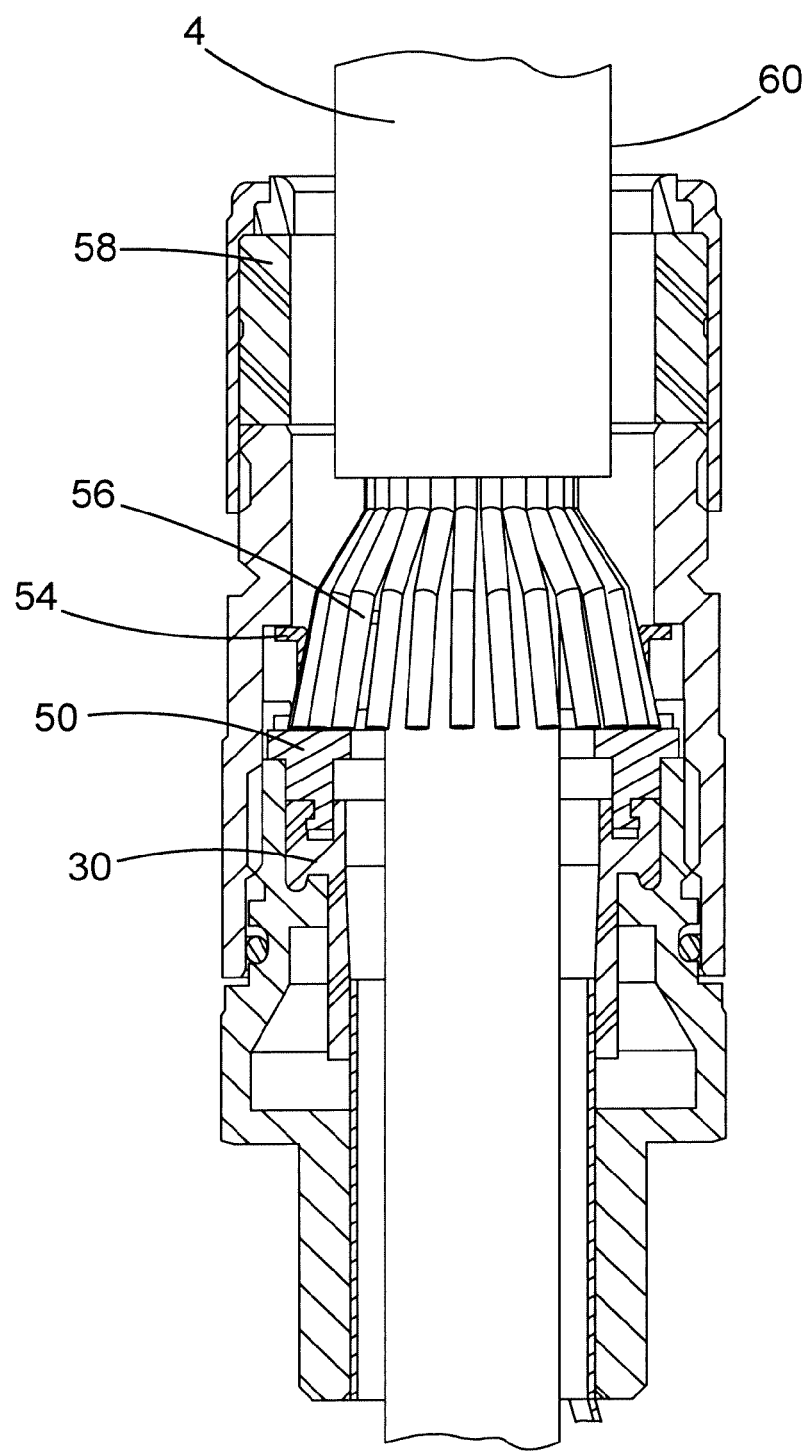
FIG. 4 is a partially cut away side view of the assembly of FIG. 2 with the first body part mounted to the second body part.
Figure 5:
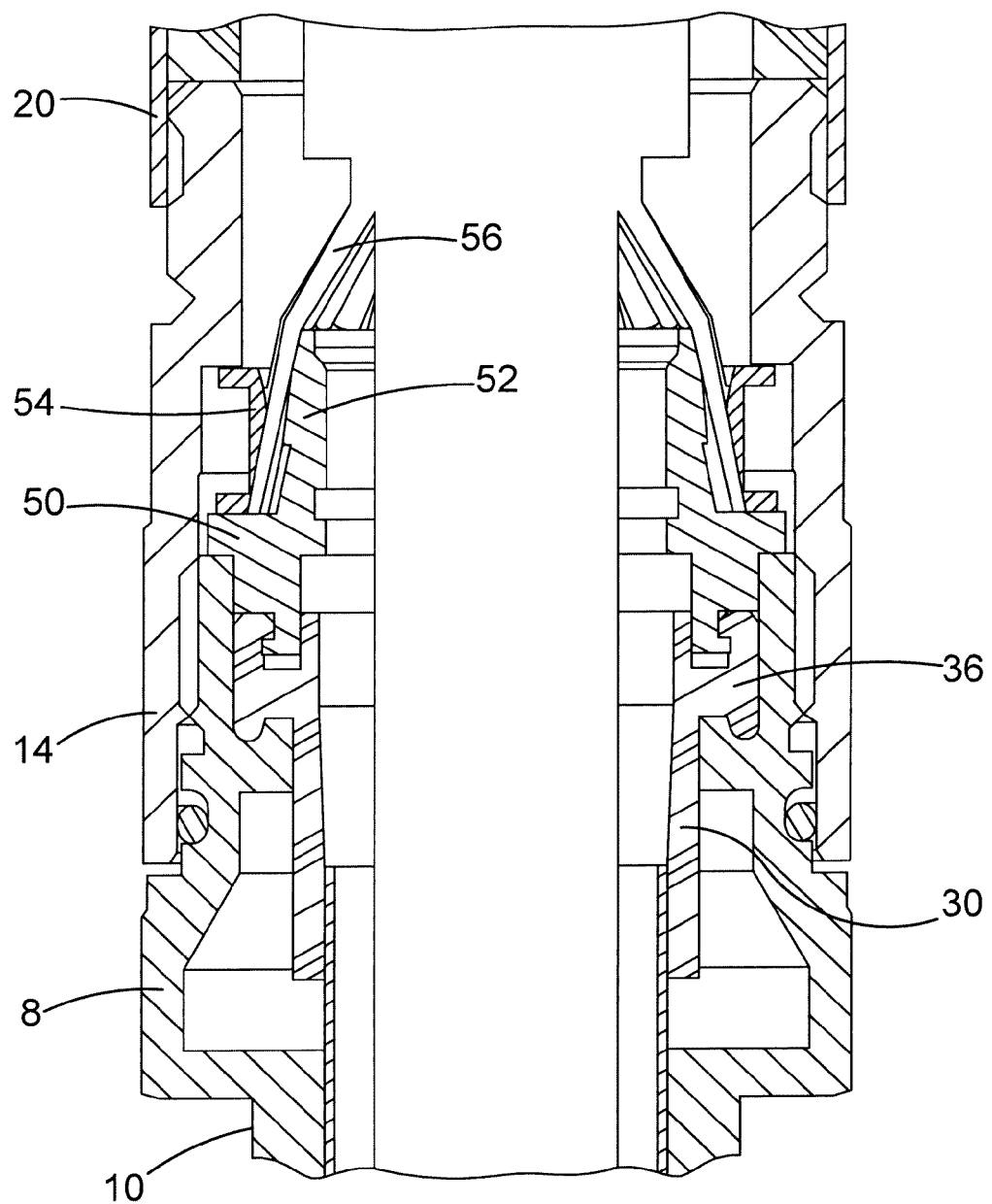
FIG. 5 is an enlarged cross-sectional side view of part of the assembly of FIG. 4.
Figure 6:
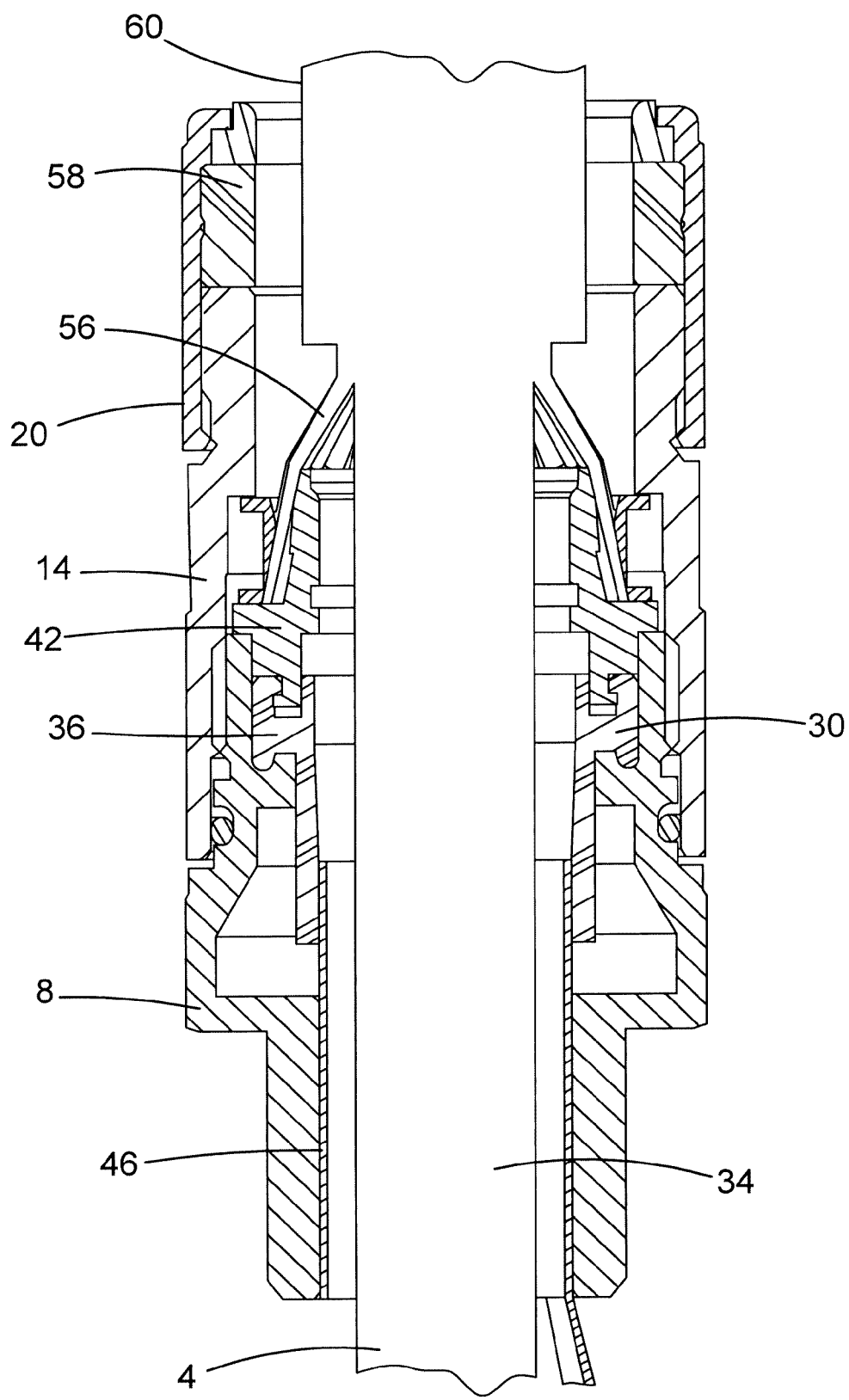
FIG. 6 is a cross-sectional view of the arrangement of FIG. 4 with the third body part tightened onto the second body part.

Referring now to FIGS. 4 and 5, the second body part 14 is mounted to the first body part 8 by mutual engagement of the screw threads 12, 16, so that the ends of the earthing members 56 become clamped between the first 42 and second 54 clamping parts and the first seal 30 becomes clamped between the first body part 6 and first clamping part 42. As shown in FIG. 6, the third body part 20 is then tightened on the second body part 14 by mutual engagement of the screw threads 18, 22, which causes axial compression of the second seal 58, thereby causing radially inward and outward movement of part of the seal 58 to create a sealing effect between the outer sheath 60 of the cable 4 and the inner surface of the third body part 20.

Figure 7:
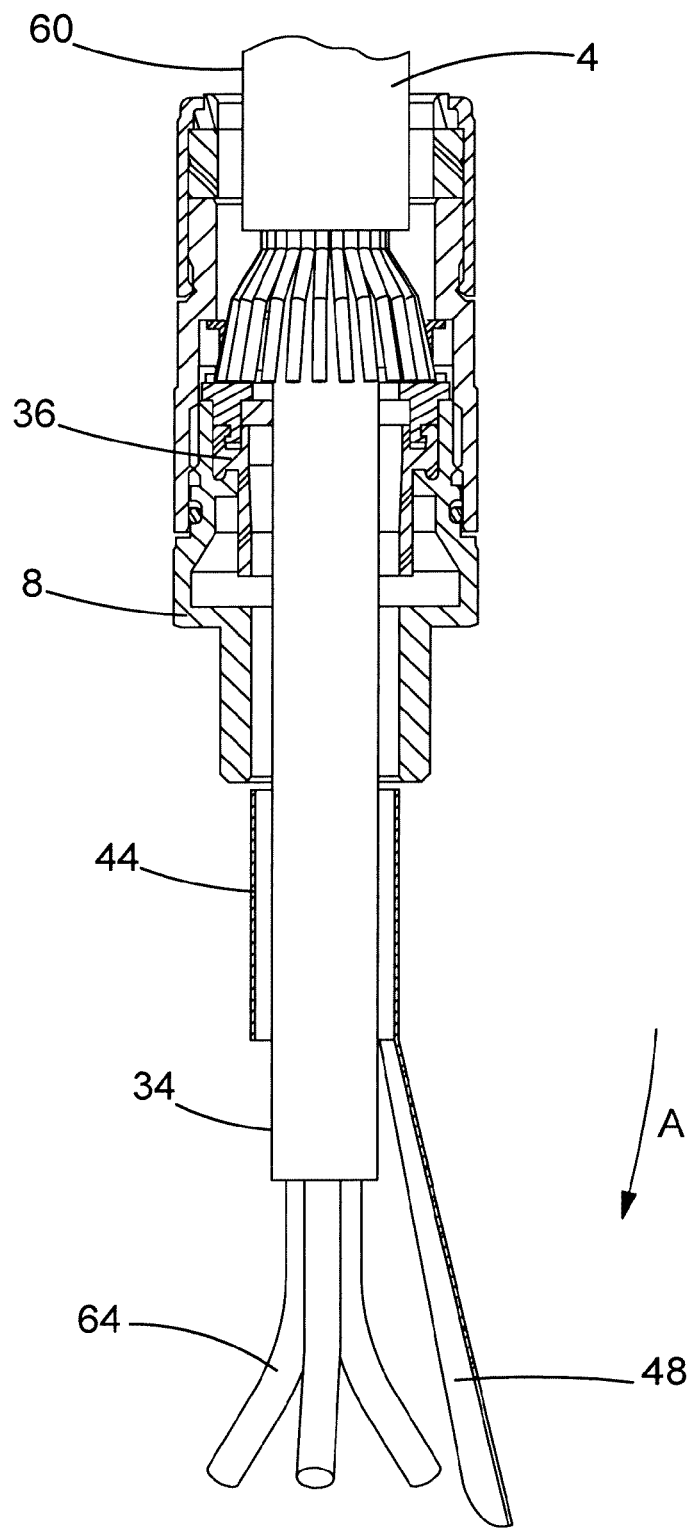
FIG. 7 is a partially cut-away side view of the arrangement of FIG. 4 during removal of the aperture opening device from the connector body.
Figure 8:
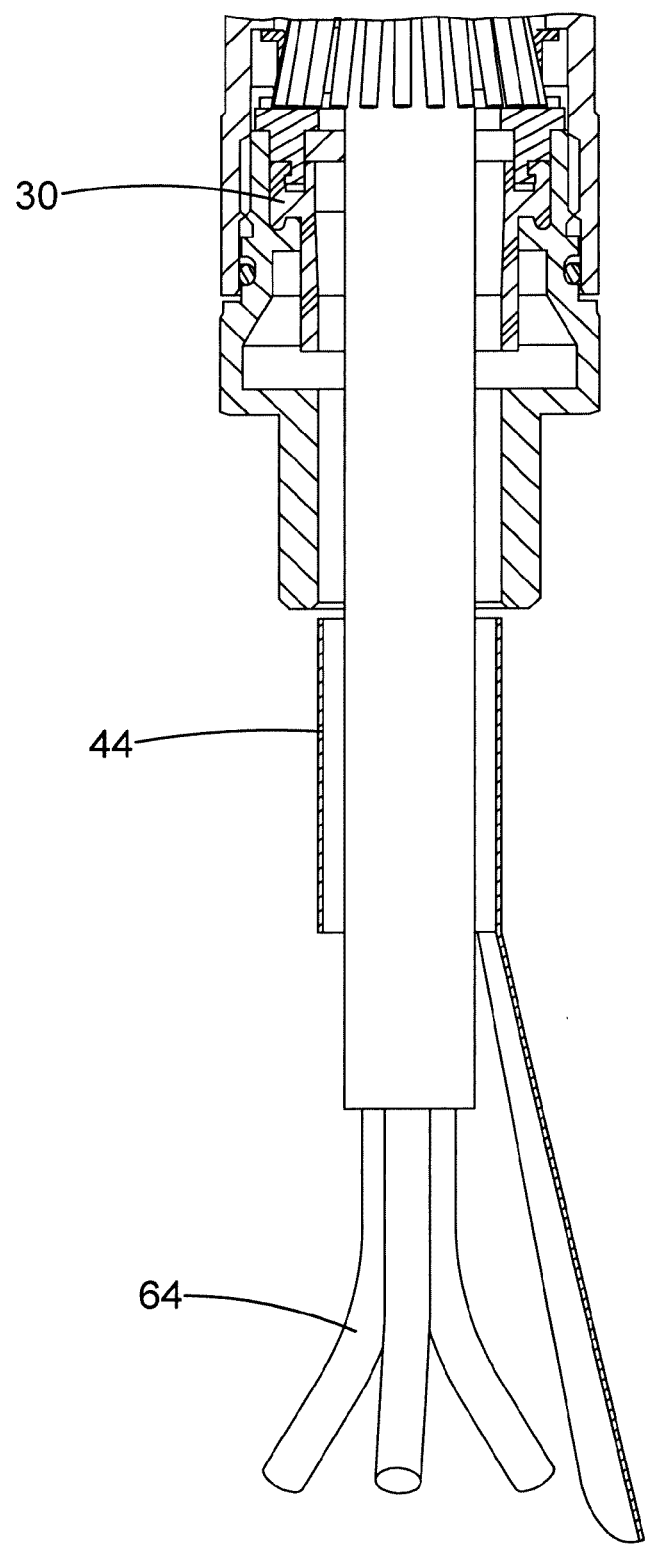
FIG. 8 is a partially cut-away side view of part of the arrangement of FIG. 7.
Figure 9:
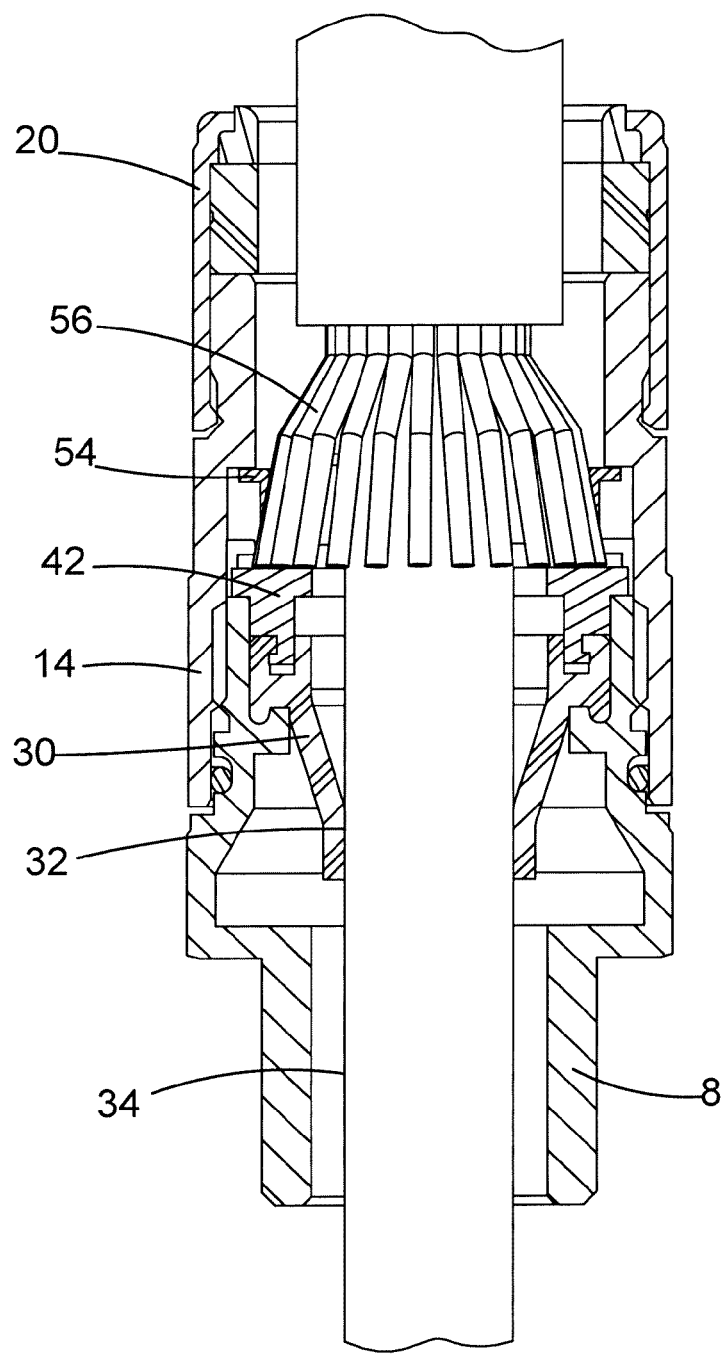
FIG. 9 is a partially cut-away side view of the assembly of FIG. 7 after removal of the aperture opening device from the connector body, and after the first seal has contracted into its final position, creating the desired seal against the cable.
Figure 10:
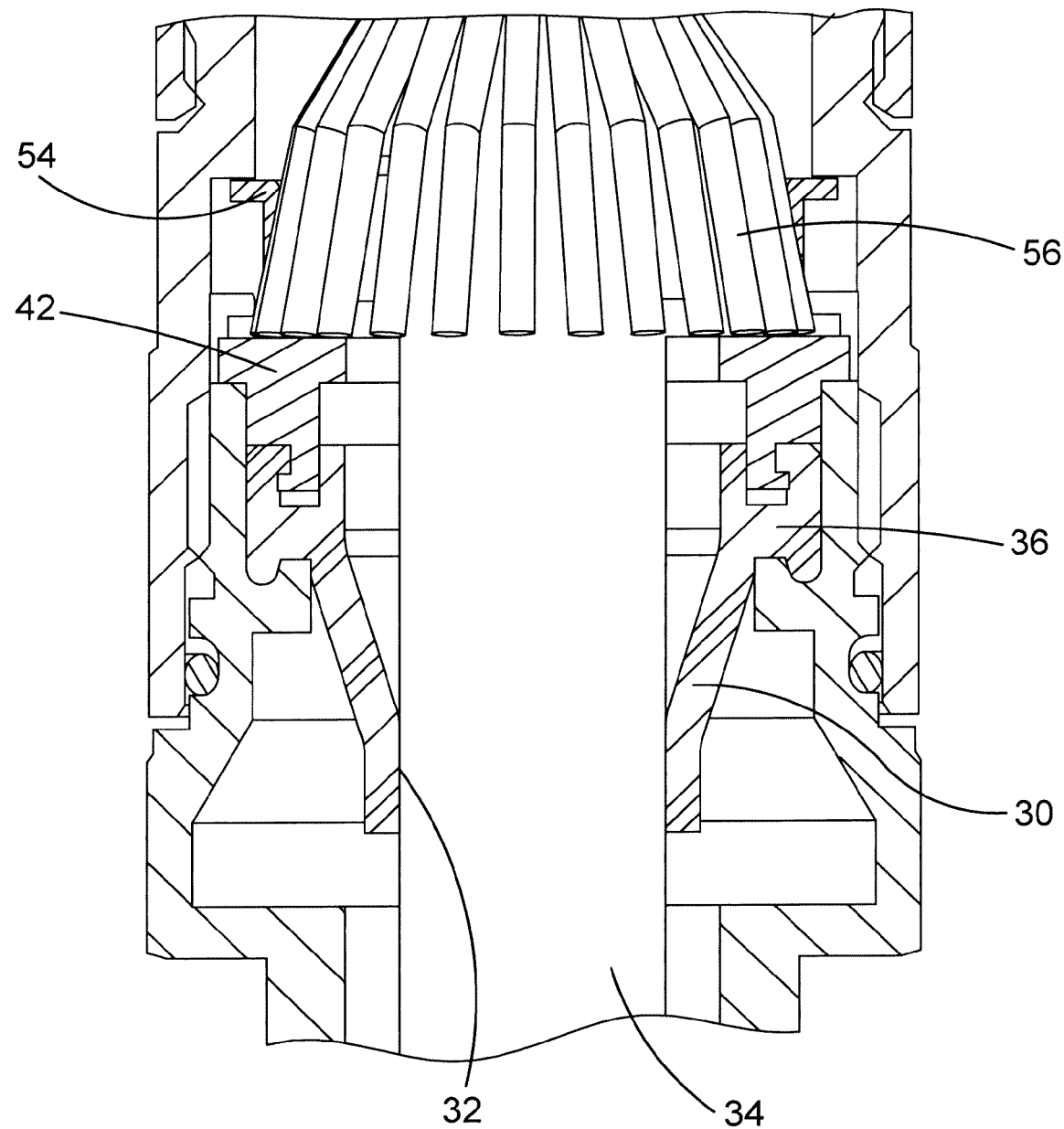
FIG. 10 is an enlarged view of part of the arrangement of FIG. 9.

Referring to FIGS. 7 and 8, the aperture opening device 44 is then removed in an axial direction as shown by arrow A along the cable 4 by gripping the first grippable part 48 to remove the aperture opening device 44 from the connector body 6. The hollow body part 46 of the aperture opening device 44 may have perforations (not shown) to enable the hollow body part 46 to be torn along its length to assist the removal process. This allows the resilient first seal 30 to come into sealing contact with the external surface of the inner sheath 34 of the cable 4, as shown in FIGS. 9 and 10, while minimising excessive wear of twisting of the seal 30.

Figure 11:
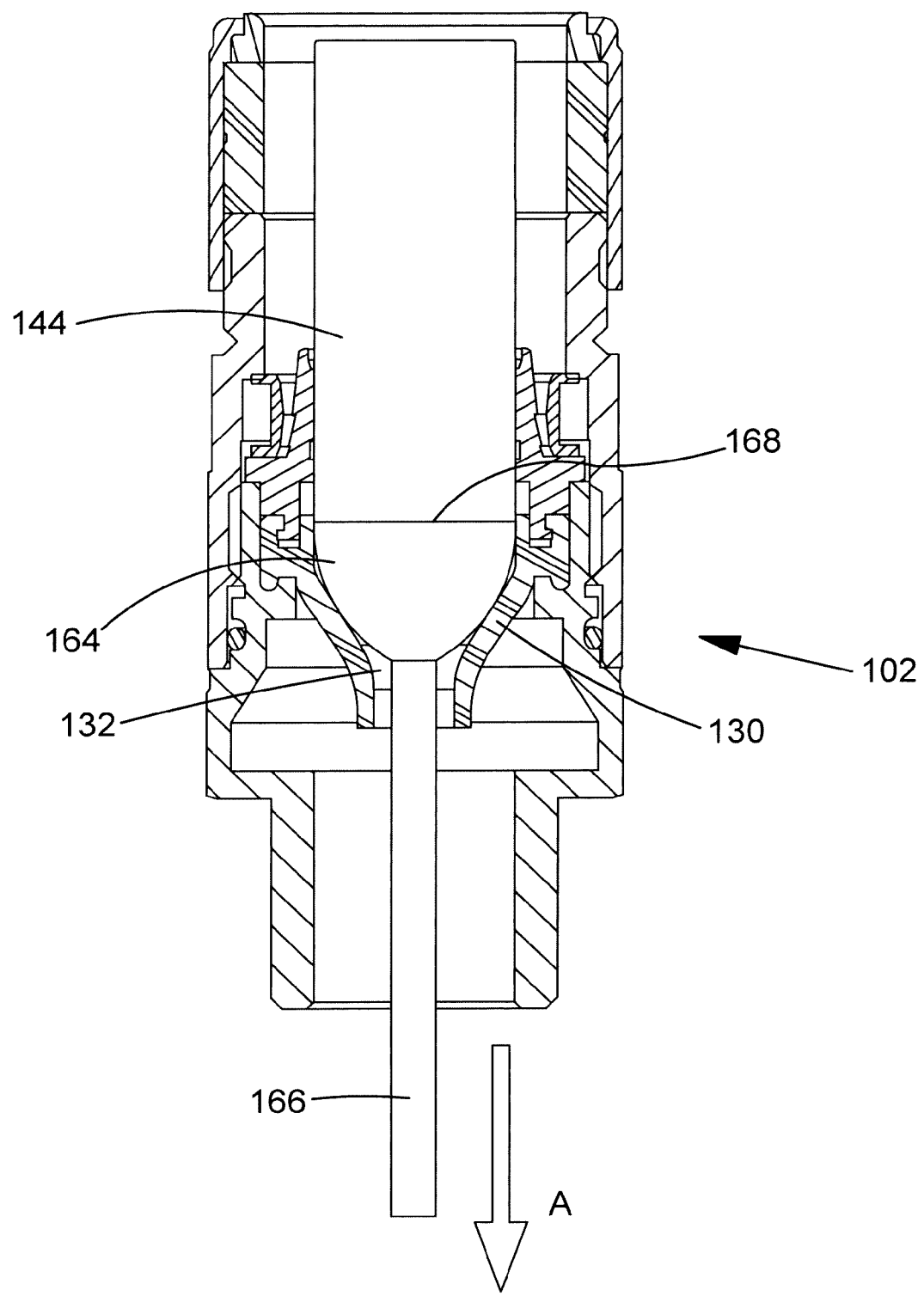
FIG. 11 is a partially cut-away side view of a connector assembly of a second embodiment of the present disclosure during insertion of the aperture opening device into the first seal thereof.

Referring to FIG. 11 in which parts common to the embodiment of FIGS. 1 to 10 are denoted by like reference numerals but increased by 100, aperture opening device 144 of a cable connector assembly 102 of a second embodiment of the present disclosure has a tapering leading portion 164 for assisting insertion of hollow body part 146 of the aperture opening device 144 into the aperture 132 of the first seal 130 while minimising the risk of damage to the seal 130. The tapering portion is provided with a second grippable part 166 for enabling the aperture opening device 144 to be pulled in the direction of arrow A through the aperture 132 in the first seal 130. The tapering portion 164 is connected to the hollow body part 146 by means of a weakened part 168 to enable removal of the tapering portion 164 and grippable part 166 from the hollow body part 146 after insertion into the aperture 132 in the seal 130.

Figure 12:
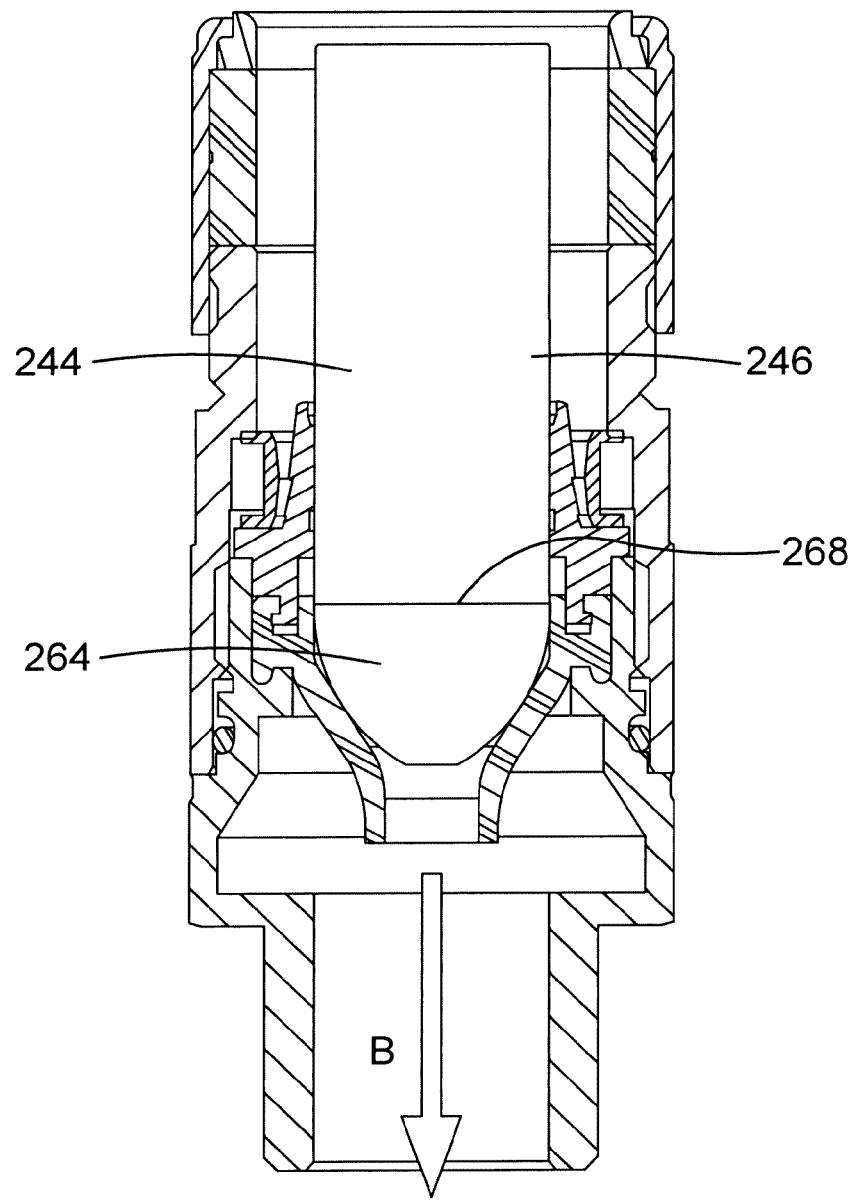
FIG. 12 is a view corresponding to FIG. 11, of a connector assembly of a third embodiment of the present disclosure.
Figure 13:
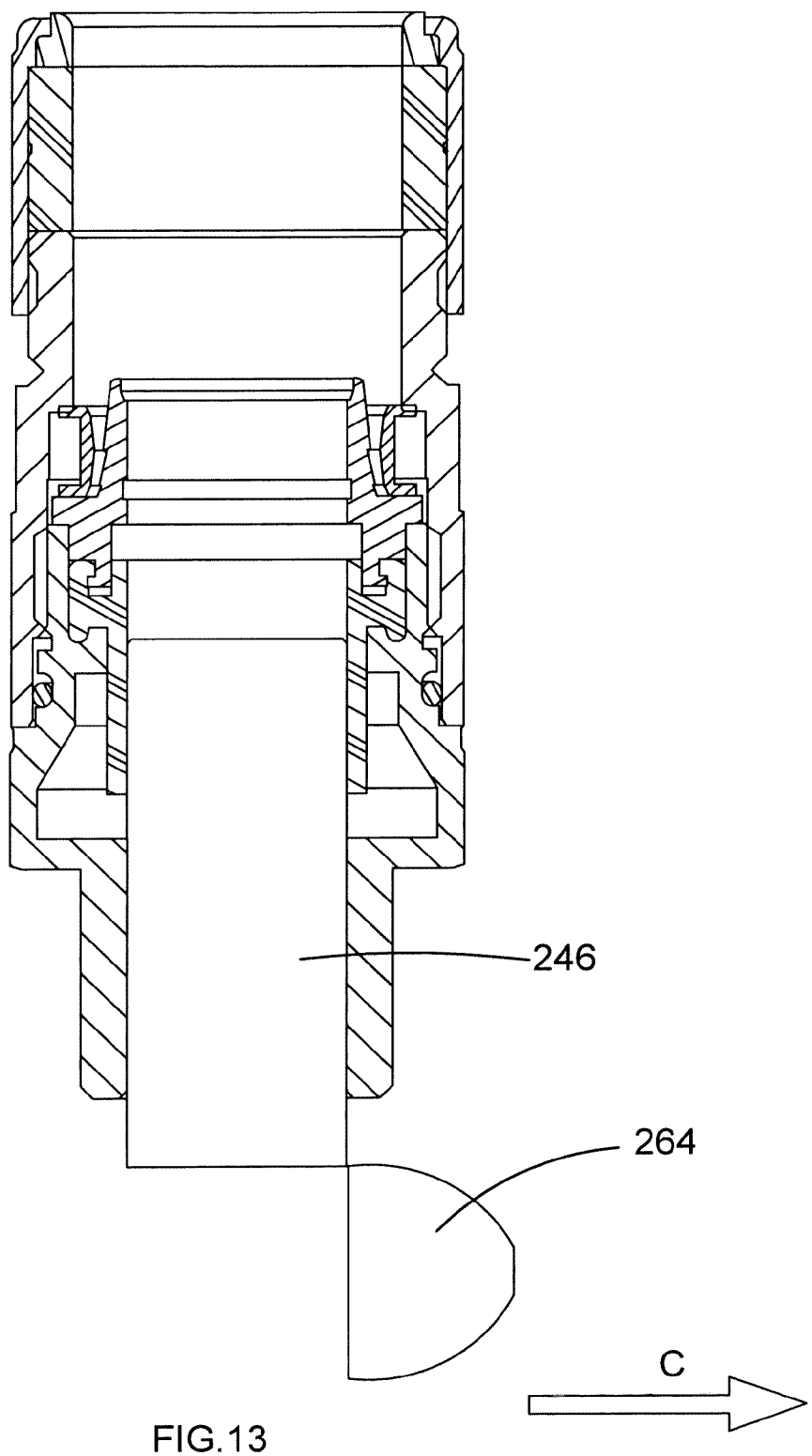
FIG. 13 shows removal of a tapered part of the aperture opening device of FIG. 12.

Referring to FIGS. 12 and 13, in which parts common to the embodiment of FIG. 11 are denoted by like reference numerals but increased by 100, an aperture opening device 244 of a third embodiment of the present disclosure is provided with a tapering portion 264 connected to a hollow body part 246 by means of a weakened part 268, and is installed in the aperture in the seal by being pushed in the direction of arrow B using the cable 204. The tapering portion can then be removed in the direction of arrow C as shown in FIG. 13.

Referring to FIGS. 14 to 19, in which parts common to the embodiment of FIGS. 1 to 10 are denoted by like reference numerals but increased by 300, a cable connector assembly 302 of a fourth embodiment of the present disclosure has a cable gland having a connector body 306 in the form of an entry item 308 having an external screw thread 310 for engaging an aperture in an enclosure (not shown) to which the cable gland is to be mounted, and an outer seal nut 314 having an external screw thread 316 for engaging an internal screw thread 312 on a second end of the entry item 308.

A first diaphragm seal 330 (FIG. 15) for engaging cable bedding 357 surrounding conductive cores 364 of a cable 304 is secured in position in the connector body 306 by means of abutment of an annular radially outward part 370 of the seal 330 with an internal radial surface 372 of the entry item 308, and is held in position by means of a diaphragm clip 374 which resiliently engages the radially outward part 370 and is in turn abutted by an inner clamp housing part 376, which surrounds conductive armour 356 of the cable 304. An outer clamp housing part 378 surrounds an outer sheath 360 of the cable 304 and the inner 376 and outer 378 clamp housing parts have respective radial surfaces 380, 382 which are urged towards each other as the outer seal nut 314 is tightened onto the entry item 308. A clamp actuator 384 (FIG. 14) has inclined surfaces 386, 388 at its ends, which engage respective inclined surfaces 390, 392 on earth clamping members 394, for engaging the earthing cable armour 356, and outer sheath clamping members 396 for engaging the cable outer sheath 360, so that as the inner 376 and outer 378 clamp housings move towards each other, the clamp actuator 384 urges the clamping members 394, 396 radially inwards into engagement with the cable 304. The clamping members 394, 396 are urged radially outwards by means of clamp springs 398.

A barbed locking ring 400 has a widened portion 402, for engaging a recess 404 (FIG. 14) on an inner surface of the outer seal nut 314, and recesses 406 (FIG. 15) for receiving an end of the outer clamp housing part 378 in order to clamp an outer seal 358 in position in the connector housing 306 to enable the seal 358 to sealingly engage the cable outer sheath 360. Part of the exposed part of the outer seal 358 is covered by an outer seal shroud 408 for protection.

Figure 14:
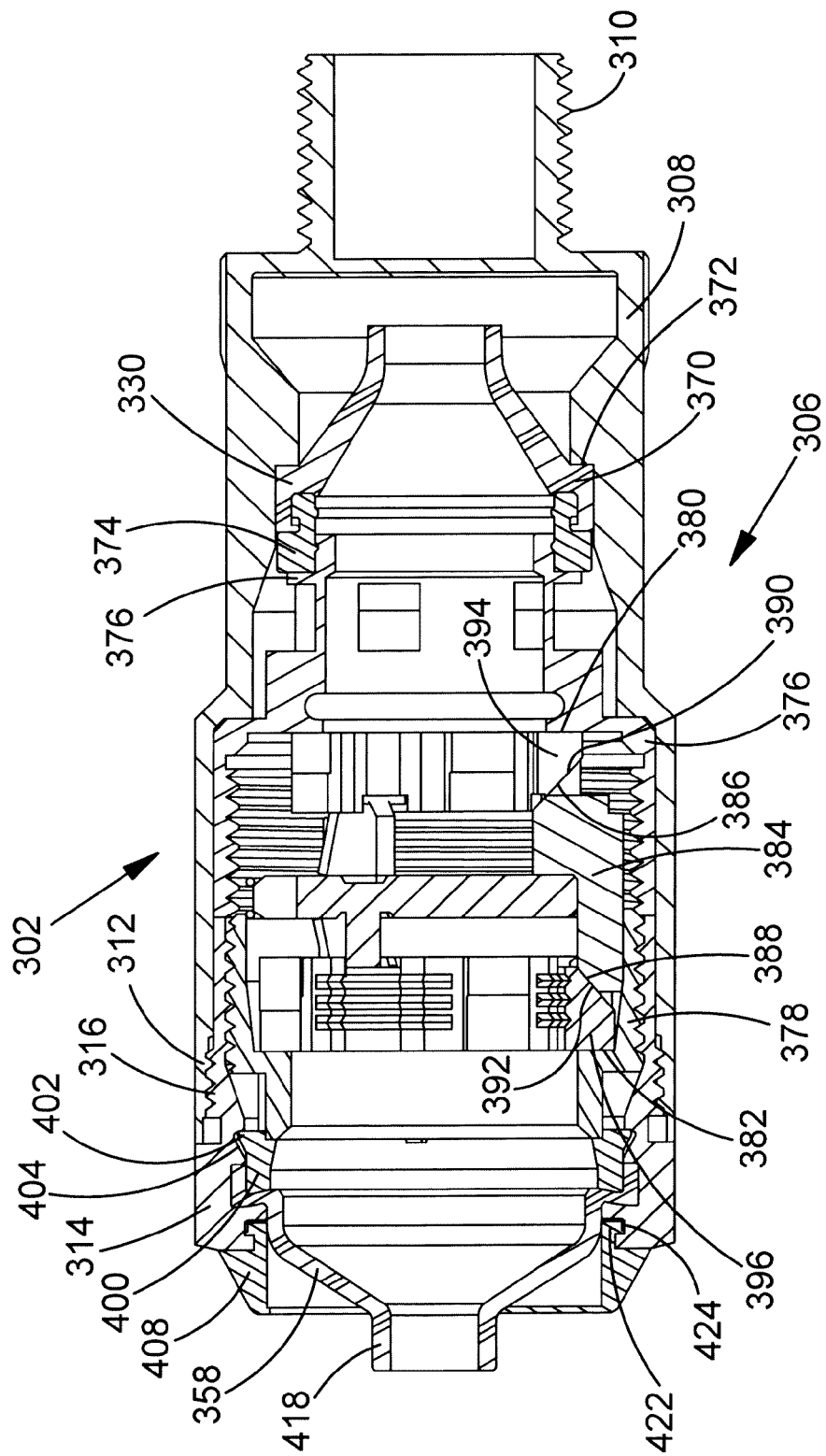
FIG. 14 is a cross sectional side view of a cable gland of a fourth embodiment of the present disclosure prior to insertion of a cable.

Referring to FIGS. 16 to 19, assembly of the cable gland of FIGS. 14 and 15 will now be described.

Figure 15:
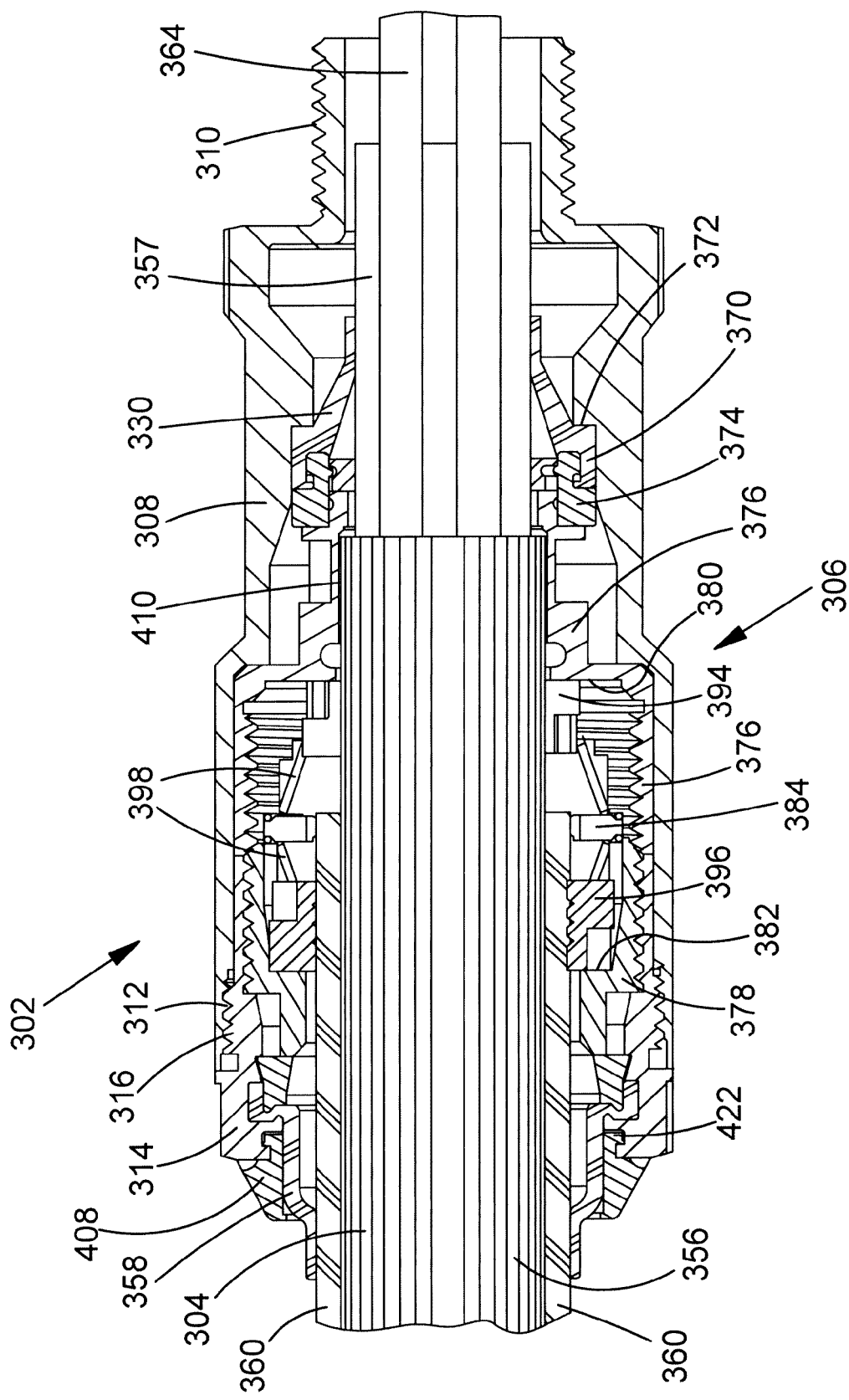
FIG. 15 is a cross sectional view of the cable gland of FIG. 14, viewed in a different sectional plane and after insertion of a cable.
Figure 16:
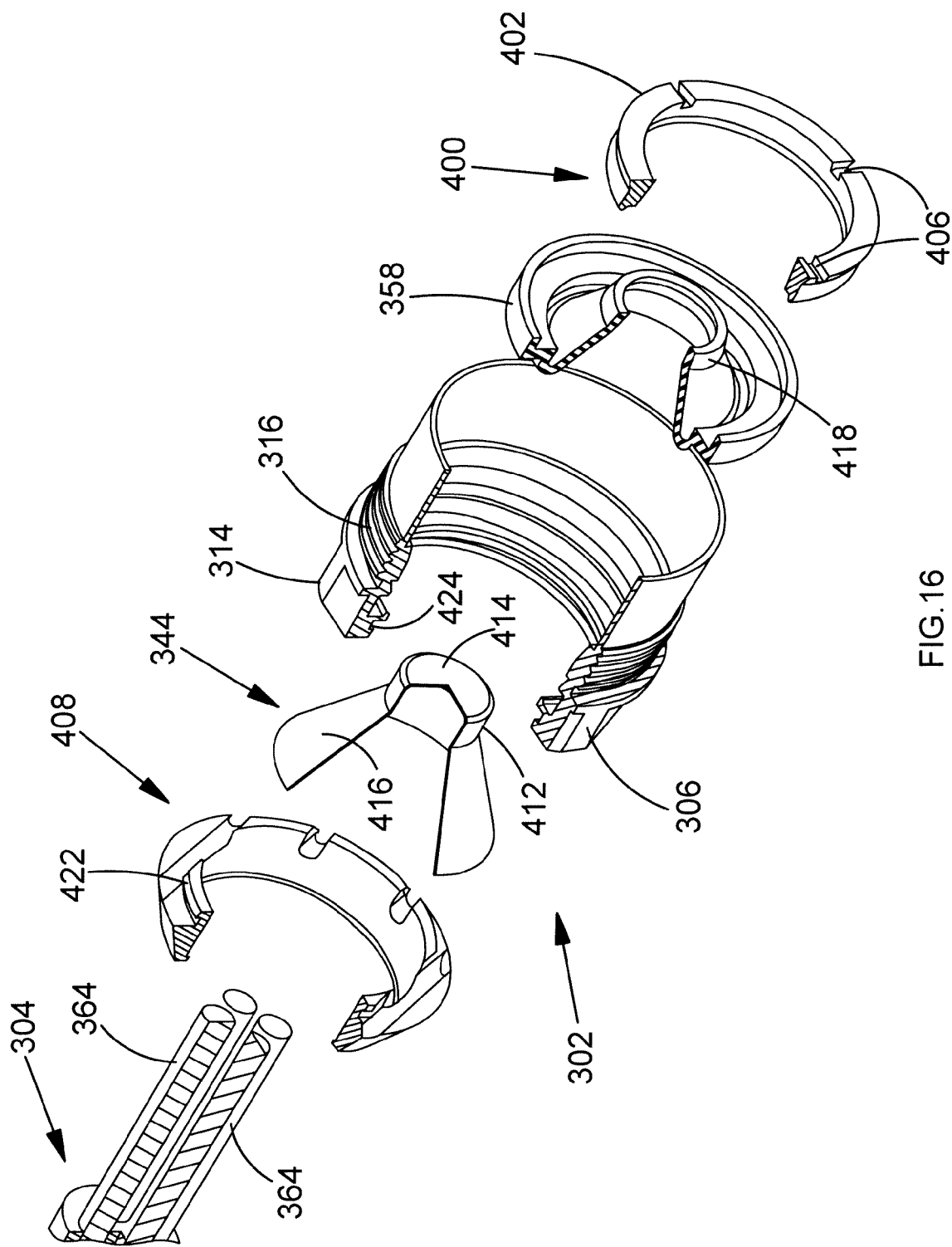
FIG. 16 is a partially cut away, exploded perspective view of part of the cable gland of FIG. 14 and a seal opening device, prior to insertion of a cable.
Figure 17:
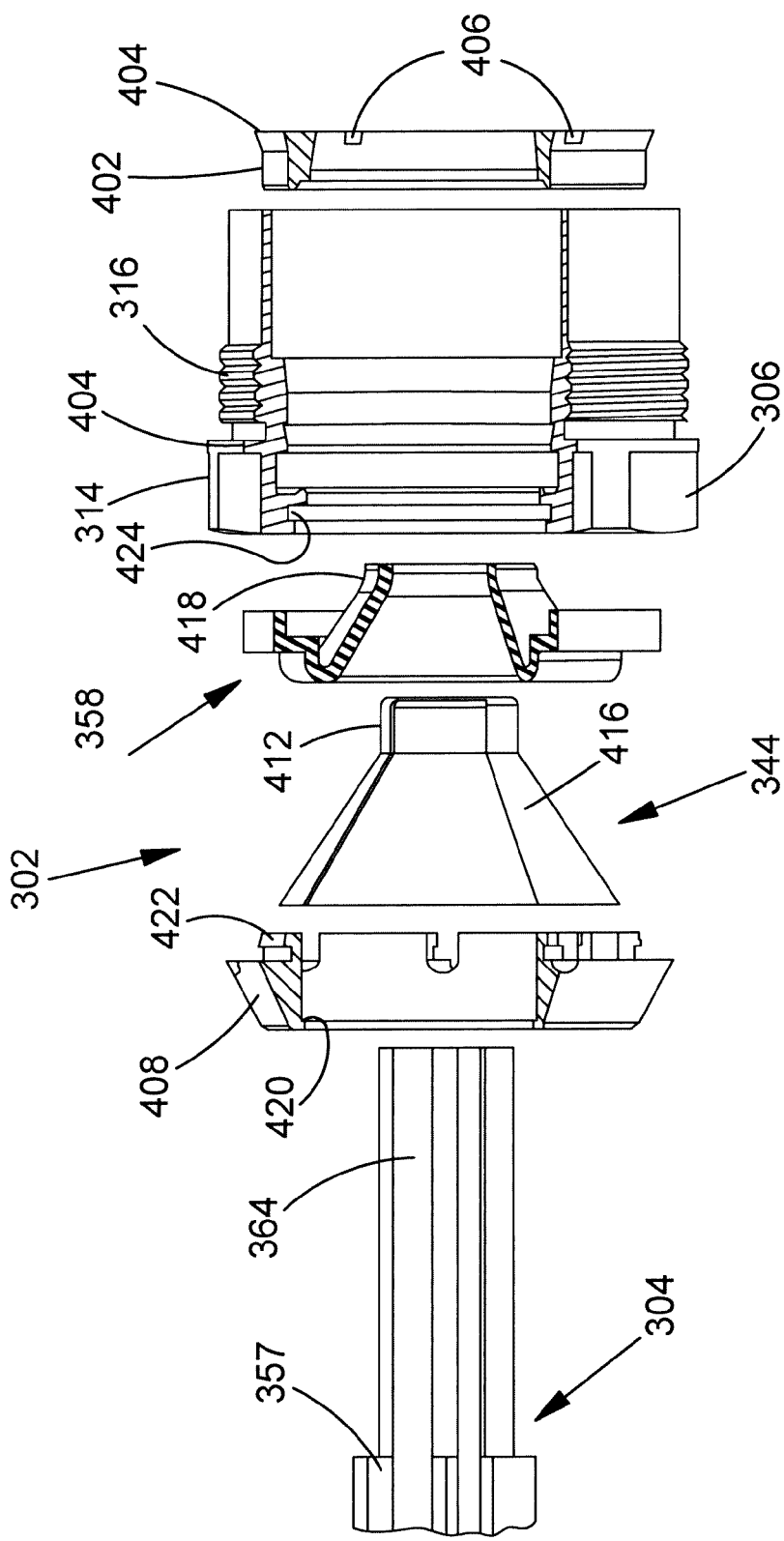
FIG. 17 is a side view of the arrangement of FIG. 16.
Figure 18:
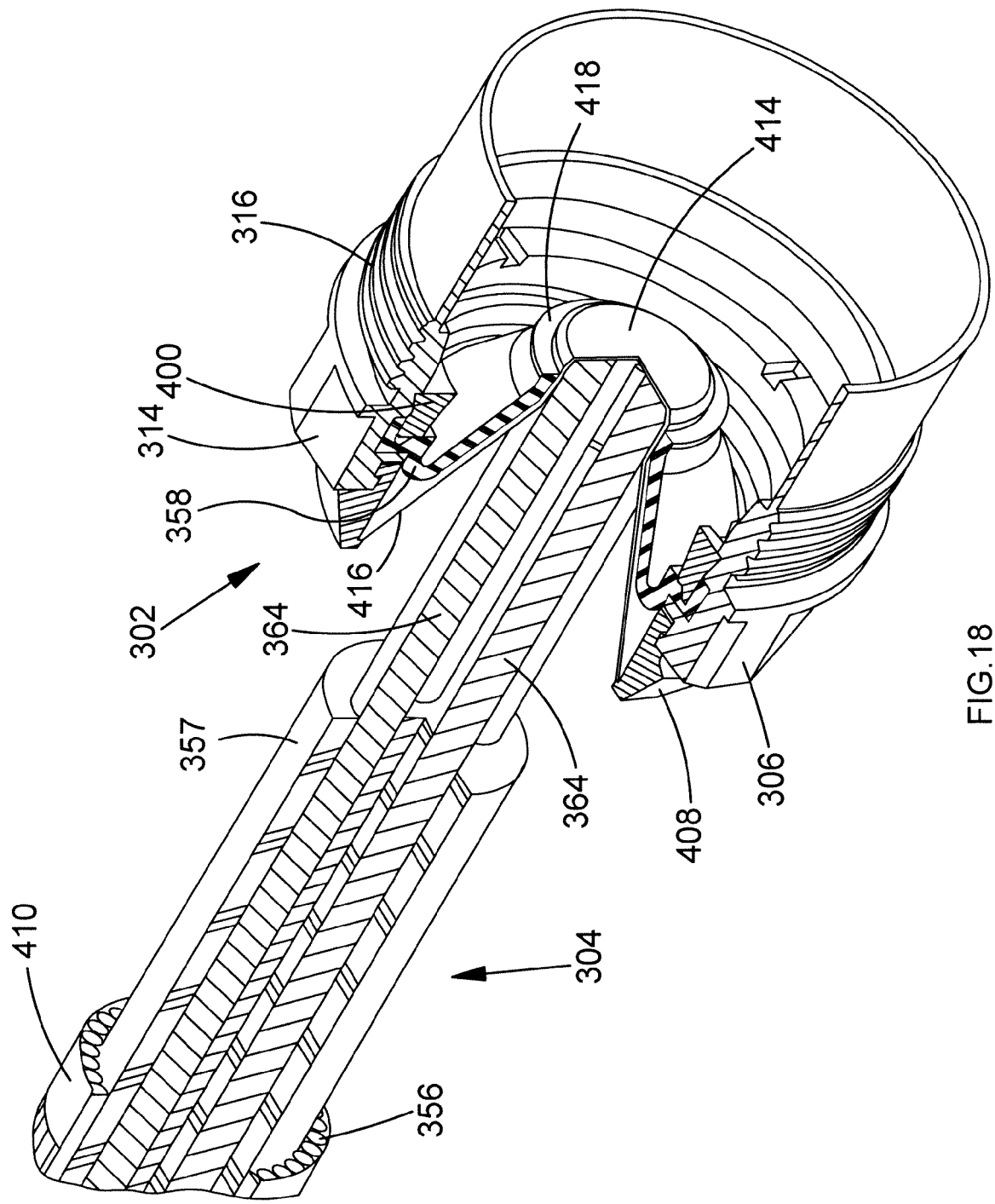
FIG. 18 is an assembled view, corresponding to FIG. 16, showing the assembly during insertion of the cable.
Figure 19:
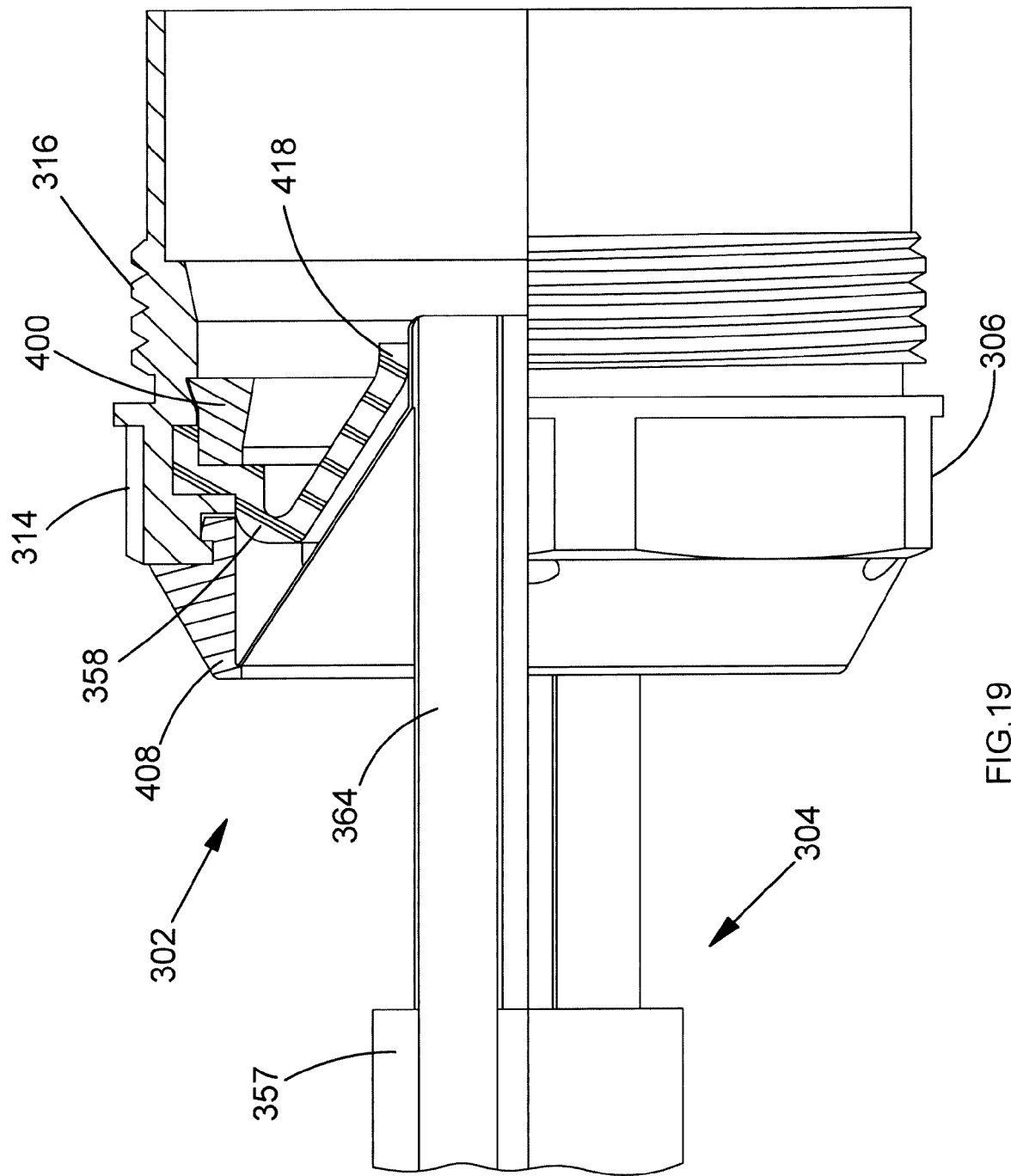
FIG. 19 is an enlarged side view of part of the arrangement of FIG. 18.

The cable 304 is prepared by removing parts of the outer sheath 360, cable armour 356 and cable bedding 357 as shown in FIG. 15. Sharp edges of the cable armour 356 are then covered by means of tape 410. A seal opening device 344 has a cylindrical part 412 having a closed end 414 and a frusto-conical part 416 extending from the cylindrical part 412. The cable gland is initially provided in assembled form in the form of the assembly shown in FIG. 18, and the cable 304 is inserted into the cable gland such that the conductive cores 364 of the cable 304 engage the closed end 414 of the seal opening device 344. The outer seal 358 is provided in an inverted condition as shown in FIG. 18, and the seal opening device 344 has its cylindrical part 412 located in a cylindrical portion 418 of the outer seal 358, and is held in position in the cable gland by abutment of the radially outermost part of the frusto-conical part 416 with a lip 420 on the outer seal shroud 408, which is in turn held in position by engagement of annular protrusions 422 on the outer seal shroud 408 with an internal groove 424 on the outer seal nut 314. The radially outermost part of the outer seal 358 is clamped in position between the outer seal nut 314 and the barbed locking ring 400.

The cable 304 is then urged into the cable gland so that the seal opening device 344 is pushed through the outer seal 358 and inner seal 330 and discarded when it has passed through both seals 330, 358. This allows the inner diaphragm seal 330 to engage the cable bedding 357, and the outer seal 358 to surround the cable outer sheath 360 in its inverted condition. The cable 306 is then pulled in an outward direction of the cable gland, which inverts the outer seal 358 on the cable outer sheath 360 to bring the outer seal 358 into its non-inverted condition, as shown in FIG. 15.

It will be appreciated by persons skilled in the art that the above embodiments have been described by way of example only and not in any limitative sense, and that various alterations and modifications are possible without departure from the scope of the disclosure as defined by the appended claims.

The invention claimed is:

1. A cable connector assembly comprising:
a connector body adapted to be mounted to a cable extending through said connector body;
at least one resilient first seal adapted to be located in the connector body for sealing between the cable and the connector body, wherein the first seal has a respective first aperture therethrough for resiliently engaging part of said cable extending through said first aperture; and
at least one aperture opening device adapted to extend through and enlarge at least one said first aperture, and having a hollow body portion for enabling said part of said cable to extend through said first aperture without engaging said first seal, wherein said aperture opening device is adapted to be removed from the connector body to enable said first seal to resiliently engage said part of said cable extending through said first aperture.

2. An assembly according to claim 1, wherein at least one said aperture opening device includes a tapering part for assisting insertion of the aperture opening device into at least one said first aperture.

3. An assembly according to claim 2, wherein at least one said tapering part is removable.

4. An assembly according to claim 1, wherein at least one said aperture opening device includes a first grippable part for enabling the aperture opening device to be pulled into at least one said first aperture.

5. An assembly according to claim 1, wherein at least one said aperture opening device includes a second grippable part for enabling the aperture opening device to be pulled out of the connector body.

6. An assembly according to claim 1, wherein the connector body includes a first body part and a second body part adapted to engage said first body part to cause at least one said first seal and/or said cable to be located relative to said connector body.

7. An assembly according to claim 1, further comprising at least one gripping device for gripping at least one sheath of said cable to locate said cable in position relative to the connector body.

8. An assembly according to claim 7, wherein at least one said gripping device comprises at least one first gripping part and at least one second gripping part, wherein a first sheath of the cable is gripped between at least one said first gripping part and at least one said second gripping part as a result of engagement of said first body part with said second body part.

9. An assembly according to claim 8, wherein at least one said first seal is gripped between the first gripping part and the first body part as a result of engagement of the first body part with the second body part.

10. An assembly according to claim 7, wherein at least one said gripping device comprises a plurality of first clamping members for gripping a first sheath of said cable, a plurality of second clamping members for gripping a second sheath of said cable, and at least one actuator device for actuating said first and second clamping members.

11. An assembly according to claim 10, wherein at least one said gripping device further comprises at least one actuator member having at least one respective first inclined surface, for engaging at least one second inclined surface on a respective said first clamping member to cause said first clamping member to grip a first sheath of the cable, at least one respective third inclined surface, for engaging at least one fourth inclined surface on a respective said second clamping member to cause said second clamping member to grip a second sheath of the cable.

12. An assembly according to claim 1, wherein at least one said aperture opening device is adapted to be removed from the connector body by means of engagement by said cable.

13. An assembly according to claim 12, wherein at least one said aperture opening device has a cable engaging part for engaging said cable to enable the aperture opening device to be pushed through at least one said first aperture by said cable.

14. An assembly according to claim 1, further comprising at least one seal clamping device for clamping at least one seal between said seal clamping device and said connector body.

15. An assembly according to claim 14, wherein at least one said seal clamping device comprises at least one seal clamping member adapted to engage the connector body.

16. An assembly according to claim 1, wherein at least one said first seal is adapted to be inverted on said cable by means of movement of said cable relative to the connector body.

17. An assembly according to claim 16, further comprising at least one protection member for at least partly covering part of said first seal protruding from the connector housing.

18. An assembly according to claim 1, further comprising a third body part, adapted to engage said second body part, and a second resilient seal having a second aperture therethrough, wherein said second seal is adapted to seal between said connector body and a part of the cable extending through said second aperture as a result of engagement of said third body part with said second body part.

* * * * *